US006664993B2

(12) United States Patent
Isono

(10) Patent No.: US 6,664,993 B2
(45) Date of Patent: Dec. 16, 2003

(54) IMAGE TRANSFER APPARATUS AND IMAGE TRANSFER METHOD

(75) Inventor: Hajime Isono, Yamanashi-ken (JP)

(73) Assignee: Nisca Corporation, Yamanashi-Ken (JP)

(*) Notice: Subject to any disclaimer, the term of this patent is extended or adjusted under 35 U.S.C. 154(b) by 55 days.

(21) Appl. No.: 10/158,201

(22) Filed: May 31, 2002

(65) Prior Publication Data

US 2003/0048348 A1 Mar. 13, 2003

(30) Foreign Application Priority Data

Aug. 23, 2001 (JP) .................................... 2001-252293

(51) Int. Cl.[7] ........................ B41J 2/325; G01D 15/16

(52) U.S. Cl. ................................................ 347/213

(58) Field of Search ................................ 347/218, 215, 347/217, 219, 171, 213

(56) References Cited

U.S. PATENT DOCUMENTS

| | | | | |
|---|---|---|---|---|
| 6,377,291 B2 | * | 4/2002 | Andoh et al. | 247/213 |
| 2003/0025781 A1 | * | 2/2003 | Honma et al. | 347/213 |
| 2003/0058326 A1 | * | 3/2003 | Araki et al. | 347/217 |

FOREIGN PATENT DOCUMENTS

| | | |
|---|---|---|
| JP | 09-131930 | 5/1997 |
| JP | 10-071789 | 3/1998 |
| JP | 2000-141727 | 5/2000 |

* cited by examiner

*Primary Examiner*—Lamson Nguyen
*Assistant Examiner*—K. Feggins
(74) *Attorney, Agent, or Firm*—Kanesaka & Takeuchi

(57) ABSTRACT

An image transfer apparatus includes a transfer medium supply portion, a transfer medium transport device for transporting a transfer medium back and forth, a transfer device for transferring an image on the transfer medium to a recording medium, and a transfer medium take-up portion for taking up the transfer medium. The transfer medium transport device transports the transfer medium backward to the transfer medium supply portion when the transfer device transfers the image to the recording medium.

10 Claims, 11 Drawing Sheets

IMAGE TRANSFER APPARATUS AND IMAGE TRANSFER METHOD

BACKGROUND OF THE INVENTION AND RELATED ART STATEMENT

This invention relates to an image transfer apparatus and an image transfer method, and particularly, it relates to an image transfer apparatus and an image transfer method for transferring a variety of information such as an image and a character to a recording medium such as a card.

Conventionally, a thermal transfer printing apparatus has been used to record a desired image or a character on a card recording medium such as a credit card, a cash card, a license card or an ID card by thermally transferring with a thermal head via a thermal transfer film. As an example, in Japanese Patent Publication (TOKKAI) No. 09-131930, a printing apparatus using a direct transfer method has been disclosed. The apparatus directly transfers an image and a character to a recording medium via a thermal transfer film. This method has an advantage of attaining a high quality image due to thermal sublimate ink. However, the recording medium needs to have a receptive layer on its printing surface to receive the ink. Therefore, only limited recording medium can be used, or the receptive layer needs to be formed on the surface of the recording medium.

Generally, a card made of a polyvinyl chloride (known as a PVC card) has been widely used as the recording medium that can receive the thermal sublimate ink. However, since the PVC card generates toxic substances when burned, recently it has been tried to switch to a card made of a polyethylene terephthalate (also known as a PET card).

Furthermore, in recent years, a new type of card media such as an IC card, which embeds an IC chip or antenna inside, has been used in a variety of fields. Because of the embedded elements, this type of card has an uneven surface, resulting in a printing problem.

In Japanese Patent Publication (TOKKAI) No. 2000-141727, a printing apparatus using an indirect transfer technology, in which an image is transferred to an intermediate transfer medium once then transferred to a final recording medium, has been disclosed to solve the above problem. According to this method, it is possible to overcome the problems such as limited recording medium related to the receptive layer or the issue of printing on an uneven surface of the recording medium. Furthermore, this method makes it easier to print an image on an entire surface of the card medium as opposed to the direct transfer method. Furthermore, in Japanese Patent Publication (TOKKAI) No. 10-71789, an over-coating apparatus for coating a surface of the card medium with a coating film has been disclosed. The apparatus uses a film having a specific pattern or an image embedded hologram as a coating film to prevent falsification of an information card made by such a printing apparatus as disclosed in the Japanese Patent Publication (TOKKAI) No. 09-131930.

The intermediate film transfer media used in the indirect transfer method or the coating film used in the over-coating apparatus is supplied from a supply portion where the film wound, transported through a transport path, and then wound on a winding portion. A transfer device such as a heat roller is arranged on a transport path, and transfers an image formed on the film transfer medium to the recording medium.

When the image is transferred while transporting the film transfer medium to the winding portion, heat from the heat roller is transmitted to an used area of the film transfer medium, such as an area on the overcoat with no image or an unused portion of the film transfer media. As a result, thermal shrinking causes damage such as wrinkles or degradations, when the transfer to the recording medium is completed. This makes it very difficult to transfer a high quality image to the card medium. If it is tried to discard the damaged portion of the film transfer media to avoid this problem, a running cost increases due to excessive material, resulting in higher manufacturing cost.

Therefore, it is an object of the present invention to provide an image transfer apparatus that can obtain a high quality image while reducing a running cost in the transfer process of the film transfer media.

Another object of the present invention is to provide an image transfer apparatus that performs a reliable transfer to the recoding medium and maintain a stable transportation of the transfer medium until the separation after transferring the image. In addition, it is possible to prevent damage caused by contact between the recording medium and the transfer medium in the transport path.

Further, an object of the present invention is to provide an image transfer method that can obtain a high quality image while reducing a running cost in the transfer process of the film transfer media.

Further objects and advantages of the invention will be apparent from the following description of the invention.

SUMMARY OF THE INVENTION

To achieve the above objects, an image transfer apparatus according to the invention is provided with a transfer media supply portion to supply a film transfer media with an image thereon; a transfer medium winding portion to wind up the film transfer medium; a transfer device to transfer the image formed on the film transfer medium to a recording medium; and a transfer medium transport device to move the film transfer medium between the transfer medium supply portion and the transfer medium winding portion. The transfer device transfers the image on the film transfer medium to the recording medium when the transfer medium transport device moves the film transfer medium toward the transfer medium supply portion.

One end of an image area on the transfer medium corresponding to the recording medium is positioned at a side toward the transfer medium winding portion beyond the transfer means. Also, the transfer means starts to transfer the image to the recording means from the other end of the image area.

Furthermore, a moving device is provided for moving the transfer device between an image transfer position and a retracted position. The moving device holds the transfer device at the image transfer position for a predetermined period of time followed by moving it to the retracted position after the image is completely transferred to the recording medium.

The transfer device may be a heat roller including a heating element.

The transfer media supply portion has an image forming device for forming an image on the transfer medium. According to this invention, the transfer device transfers an image to the recording medium while the transfer medium transport device transports the transfer medium toward the image forming device.

According to another aspect of the invention, an image transfer apparatus is provided with a transfer media supply portion to supply a film transfer media with an image thereon; a transfer medium winding portion to wind up the film transfer medium; a transfer device to transfer the image formed on the film transfer medium to a recording medium; a recording medium transport path to transport the recording medium; and a transfer medium guide member to guide the recording medium to an image transfer position on the transfer device. The transfer medium guide member is disposed between the transfer media supply portion and the transfer device to be capable of moving in a direction away from the recording medium transport path.

The transfer medium guide member includes a guide portion for separating the recording medium with an image transferred by the transfer device from the transfer medium.

When the transfer device transfers the image on the transfer medium to the recording medium, one end of the guide portion is positioned in the recording medium transport path.

Also, an image transfer method according to the invention includes a transport process, in which the film transfer medium with an image is transported to the image transfer position and the recording medium is transported to the image transfer position, and a transfer process for transferring the image formed on the transfer medium to the recording medium at the image transfer position. The image is transferred while the transfer medium is transported in a direction toward a supply portion side opposite to the image transfer position.

Furthermore, the image transfer method includes an image forming process for forming an image on the aforementioned transfer medium. The image is transferred while the transfer medium is transported toward the image forming position opposite to a direction in the transport process after the image forming process and the transport process.

Other objectives and features of the present invention will be explained in a detailed description of preferred embodiment below based upon provided drawings.

DETAILED DESCRIPTION OF PREFERRED EMBODIMENTS

Hereunder, preferred embodiments of the invention will be explained with reference to the accompanied drawings.

Figure 1:
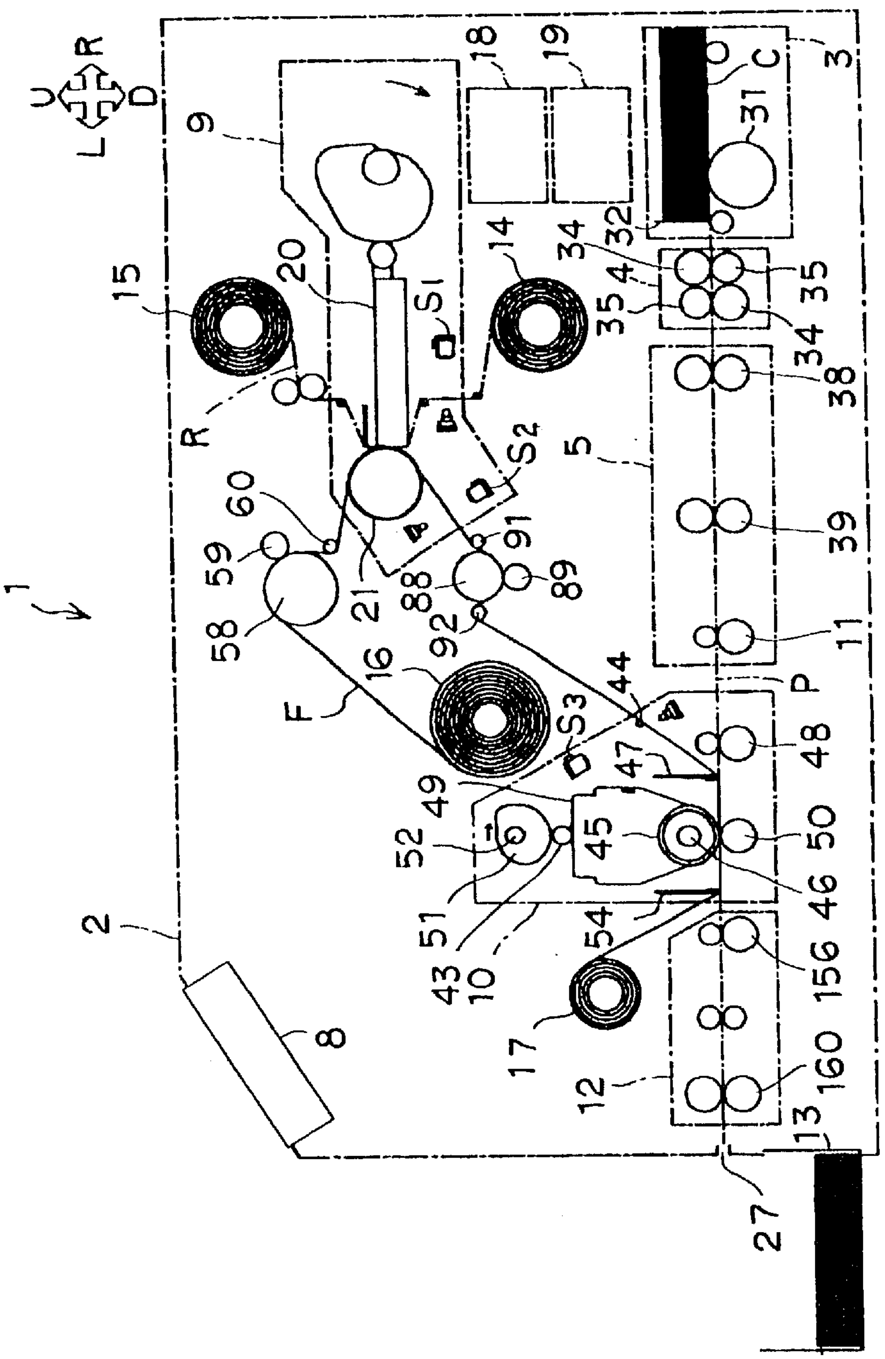
FIG. 1 is a side view showing a configuration of an image transfer apparatus according to an embodiment of the present invention.

As seen in FIG. 1, an image transfer apparatus 1 according to the embodiment of the present invention has a card transport path ‘P’ in a housing 2. A card ‘C’ as a recording medium is transported in the card transport path for forming (or transferring) an image thereon using an indirect transfer method. On the card transport path ‘P’ are arranged a card supply portion 3 for separating and feeding the card ‘C’ one by one to the card transport path ‘P’; a cleaner 4 for cleaning both surfaces of the card ‘C’ at downstream of the card supply portion 3; and a horizontal transport portion 5 for transporting the card ‘C’ horizontally at downstream of the cleaner 4.

The card supply portion 3 includes a card stacker to store the card ‘C’. A stacker side plate 32 with an opening slot to pass just one card ‘C’ is arranged on the card stacker at a position facing the card transport path P. A kick roller 31 is fixed to a bottom of the card stacker, and rotates to feed the card ‘C’ sequentially from a bottom card stored in the card stacker. The cleaner 4 includes a cleaning roller 34, which is made of a rubber material with a sticky material on its surface, and a pressing roller 35 for pressing the cleaning roller at a nip point with the card transport path ‘P’ in between. The horizontal transport portion 5 includes paired horizontal transport rollers 38, 39 and 11 facing each other to nip the card ‘C’. One of the paired horizontal transport rollers 38, 39 or 11 is a driving roller, and the others are following the drive roller.

Also, the image transfer apparatus 1 has an image forming portion 9 above the card supply portion 3, the cleaner 4 and the horizontal transport portion 5. The image forming portion 9 forms an image, which corresponds to a mirror image data from a thermal head control unit 19, on the intermediate transfer sheet F by heating thermal transfer ink. Using a similar configuration to a thermal transfer printer, the image forming portion 9 includes a platen roller 21 for supporting the intermediate transfer sheet 'F' when forming the image on the intermediate transfer sheet 'F', and a thermal head 20 arranged to be able to move with respect to the platen roller 21. A thermal transfer sheet 'RR' is interposed between the platen roller 21 and thermal head 20.

Figure 7A:
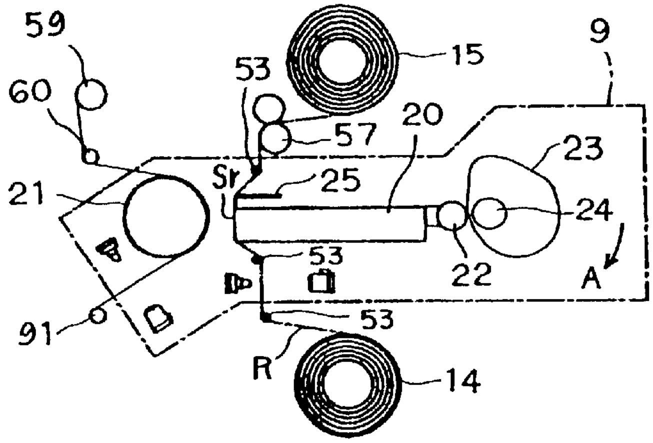
FIG. 7A is a side view showing an image forming portion of the image transfer apparatus in a state where a thermal head is retracted.
Figure 7B:
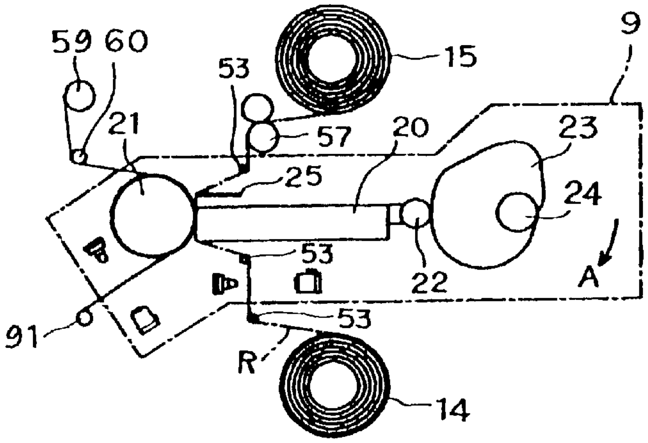
FIG. 7B shows a side view showing an image forming portion forming an image on an intermediate transfer sheet.

As shown in FIG. 7A and FIG. 7B, the thermal head 20 is moved with respect to the platen roller 21 by such components as a holder (not shown) supporting the thermal head 20 to be detachable; a follower roller 22 fastened to the holder; a non-circular thermal head sliding cam 23 rotating in either direction (a direction of arrow A or an opposite direction in the drawing) around a cam shaft 24 while contacting an outer surface of the follower roller 22; and a spring (not shown) for pressing the holder against the thermal head sliding cam 23.

Figure 4A:
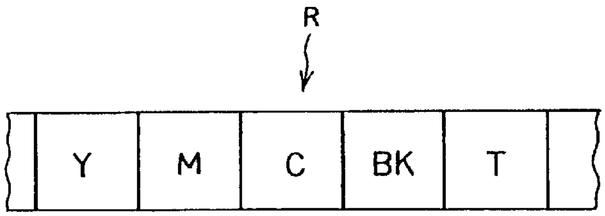
FIG. 4A is a schematic front view showing a thermal transfer sheet.

As shown in FIG. 4, the thermal transfer sheet 'RR' sequentially carries inks, 'Y' (yellow), 'M' (magenta), C (cyan) and Bk (black), on the film in a width slightly larger than a length of the card 'C'. A protective layer region 'T' for protecting the card C surface is formed thereon next to the Bk (black), and this pattern is repeated along the film.

As shown in FIG. 7A and FIG. 7B, the thermal transfer sheet 'RR' is supplied from the thermal transfer sheet supply portion 14 where the thermal transfer sheet 'RR' is wound in a roll. The thermal transfer sheet 'RR' is guided by a plurality of guide rollers 53 and the guide plate 25 fastened to the holder (not shown), then is driven along with a rotation of the paired take-up roller 57 while contacting substantially the entire surface of the leading edge of the thermal head 20. Finally, the sheet is rolled on the thermal transfer sheet take-up portion 15. The thermal transfer sheet supply portion 14 and the thermal transfer sheet take-up portion 15 are disposed at both sides of the thermal head 20, and the centers thereof are mounted onto the spool shaft. In the image forming portion 9, a mark for positioning of the thermal transfer sheet 'RR', a light emitting element, and a light receiving element (hereinafter referred to as light reception sensor S1) for detecting the Bk portion on the thermal transfer sheet 'RR' are arranged between the guide rollers 53, which are disposed between the thermal transfer sheet supply portion 14 and the thermal head 20, being away from and perpendicular to the thermal transfer sheet 'R'. A gear (not shown) is attached to a roller shaft of the paired take-up rollers 57 at a drive side, and engages another gear with a clock plate (not shown) on the same shaft. A unit transmission sensor (not shown) is disposed near the clock plate for detecting the rotation of the clock plate to control a wound amount of the thermal transfer sheet 'RR'.

A printing position Sr (a heating position) of the thermal head 20 through the thermal transfer sheet 'R' with respect to the intermediate transfer sheet 'F' is located on a circumference of the platen roller 21 at an intersecting point with an imaginary horizontal line extending toward the thermal head 20 from the center of the platen roller 21 shaft.

Figure 4B:
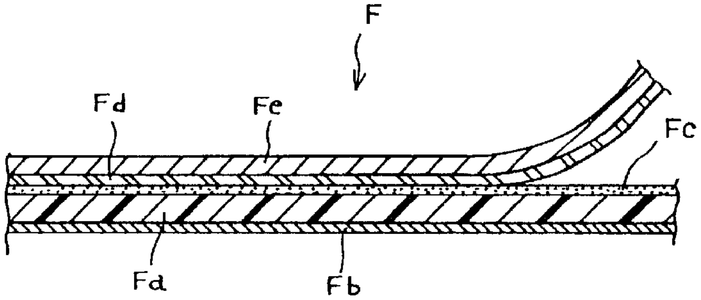
FIG. 4B is a schematic sectional view showing an intermediate transfer sheet.

As shown in FIG. 1, FIG. 7A and FIG. 7B, the intermediate transfer sheet 'F' is wound around the platen roller 21 on a surface facing the thermal head 20. As shown in FIG. 4B, the intermediate transfer sheet 'F' is a laminated film formed of a base film Fa; a back surface coating layer Fb formed on a back side of the base film Fa; a receptive layer Fe for receiving ink; an overcoat layer Fd for protecting the receptive layer surface; and a peeling film Fc. The peeling film is formed on a front side of the base film, and facilitates separation from the base film Fa by the thermally bonding the overcoat layer Fd and the receptive layer Fe. They are laminated in a order of the back surface coating layer Fb, the base film Fa, the peeling film Fc, the overcoat layer Fd, and the receptive layer Fe from the bottom. The intermediate transfer sheet 'F' is wound with the receptive layer Fe facing the thermal transfer sheet 'R' and the back coating layer Fb side contacting the platen roller 21. At the printing position Sr, when an image is formed on the intermediate transfer sheet (see FIG. 7B), the intermediate transfer sheet 'F' is transported at a speed same as that of the thermal transfer sheet 'R'. Furthermore, in the image forming portion 9, a light emitting element and a light receiving element (hereinafter referred to as light receiving sensor S2) for detecting a positioning mark of the intermediate transfer sheet 'F' are arranged between the platen roller 21 and guide roller 91, being away from and perpendicular to the intermediate transfer sheet 'F'.

Also, as seen in FIG. 1, the image transfer apparatus 1 is equipped with a transfer portion 10, which is a transfer device to transfer an image formed on the intermediate transfer sheet 'F' in the image forming portion 9 to the card C at downstream of the horizontal transport portion 5 on the card transport path 'P', and a horizontal transport discharge portion 12, which includes a pair of discharge rollers to horizontally transport the card 'C' to downstream of the transfer portion 10 and discharge the same out of the frame 12.

The transfer portion 10 is equipped with a platen roller 50, which supports the card 'C' when the image is transferred from the intermediate transfer sheet F to the card 'C', and a heat roller 45 disposed to be able to move back and forth with respect to the platen roller 50. A heating lamp 46 is disposed in the heat roller 45 as a heating body to heat the intermediate transfer sheet 'F'. The intermediate transfer sheet 'F' is interposed between the platen roller 50 and the heat roller 45.

Figure 8A:
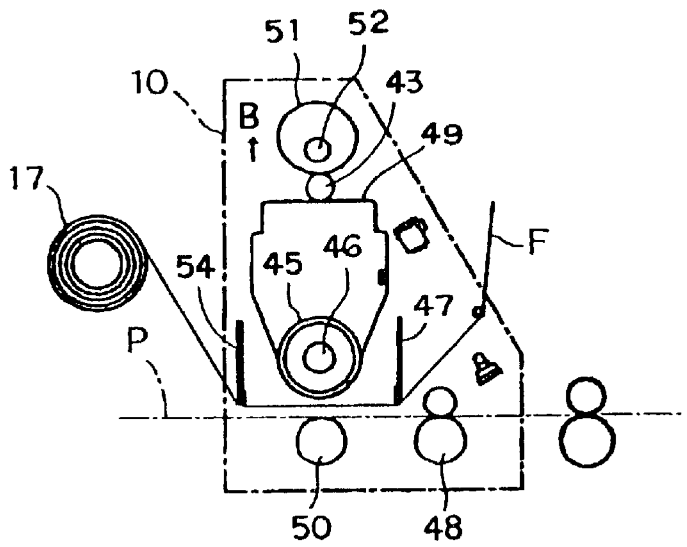
FIG. 8A is a side view showing a transfer portion of the image transfer apparatus in a state where a heat roller is at a retracted position.
Figure 8B:
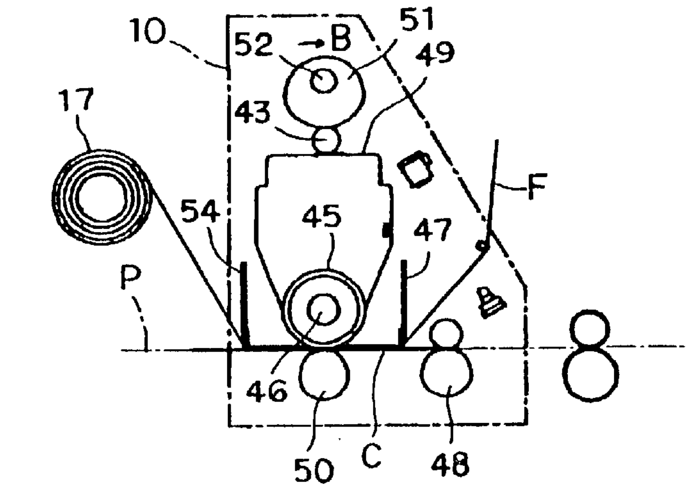
FIG. 8B is a side view showing a transfer portion of the image transfer apparatus in a state where the heat roller is at an image forming position.

As shown in FIG. 8A and FIG. 8B, the heat roller 45 is moved with respect to the platen roller 50 by such components as a holder 49 supporting the heat roller 45 to be detachable; a follower roller 43 fastened to the holder 49; a non-circular heat roller lifting cam 51 rotating in a direction (a direction of arrow B) around a cam shaft 52 while contacting an outer surface of the follower roller 43; and a spring (not shown) disposed in the holder 49 for pressing the holder 49 against the heat roller lifting cam 51.

The intermediate transfer sheet 'F' is supplied from the intermediate transfer sheet supply portion 16 where the intermediate transfer sheet 'F' is wound in a roll. The intermediate transfer sheet 'F' is guided through such components as a transport roller 58 accompanied by a follower roller 59; a guide roller 60; the platen roller 21; a guide roller 91; a back-tension roller 88 for applying a tension to the intermediate transfer sheet 'F' along with a pinch roller 89; a guide roller 92; a guide roller 44; a guide plate 47, which is disposed between the guide roller 44 and the heat roller 45 and fixed to a frame constituting the transfer portion 10 for guiding and separatinf the card 'C' from the intermediate transfer sheet F; an auxiliary guide plate 54 fixed to the frame constituting the transfer portion 10. The guide plate 54 is disposed between the heat roller 45 and a sheet winding portion 17, and along with the guide plate 47 prevents the intermediate transfer sheet F from touching the heat roller 45 when the transfer portion 10 is not operating. Finally, the sheet is rolled on the sheet winding portion 17. Also, as seen in FIG. 8B, when the transfer portion 10 is operating, the intermediate transfer sheet F is nipped by the platen roller 50 and the heat roller 45 on the card transport path ‘P’ with the card C interposed therebetween, and is wound in a direction of the arrow ‘E’ toward at the image forming portion 9.

As seen in FIG. 1, a pair of horizontal transport rollers is disposed at downstream of the paired horizontal transport rollers 11 and upstream of the platen roller 50. The horizontal transport rollers are nipped with and driven by the capstan roller 48 with the card transport path ‘P’ in between, and can transport the card ‘C’ in either of arrow ‘L’ or ‘R’ directions in cooperation with the horizontal transport rollers including a capstan roller 156 arranged on the transfer portion 10 side of the horizontal transport discharge portion 12. Furthermore, in the transfer portion 10, a light emitting element and a light receiving element (hereinafter referred to as light receiving sensor S3) for detecting the positioning mark of the intermediate transfer sheet ‘F’ are arranged between the guide roller 44 and the guide plate 47, being over the intermediate transfer sheet ‘F’.

Figure 2:
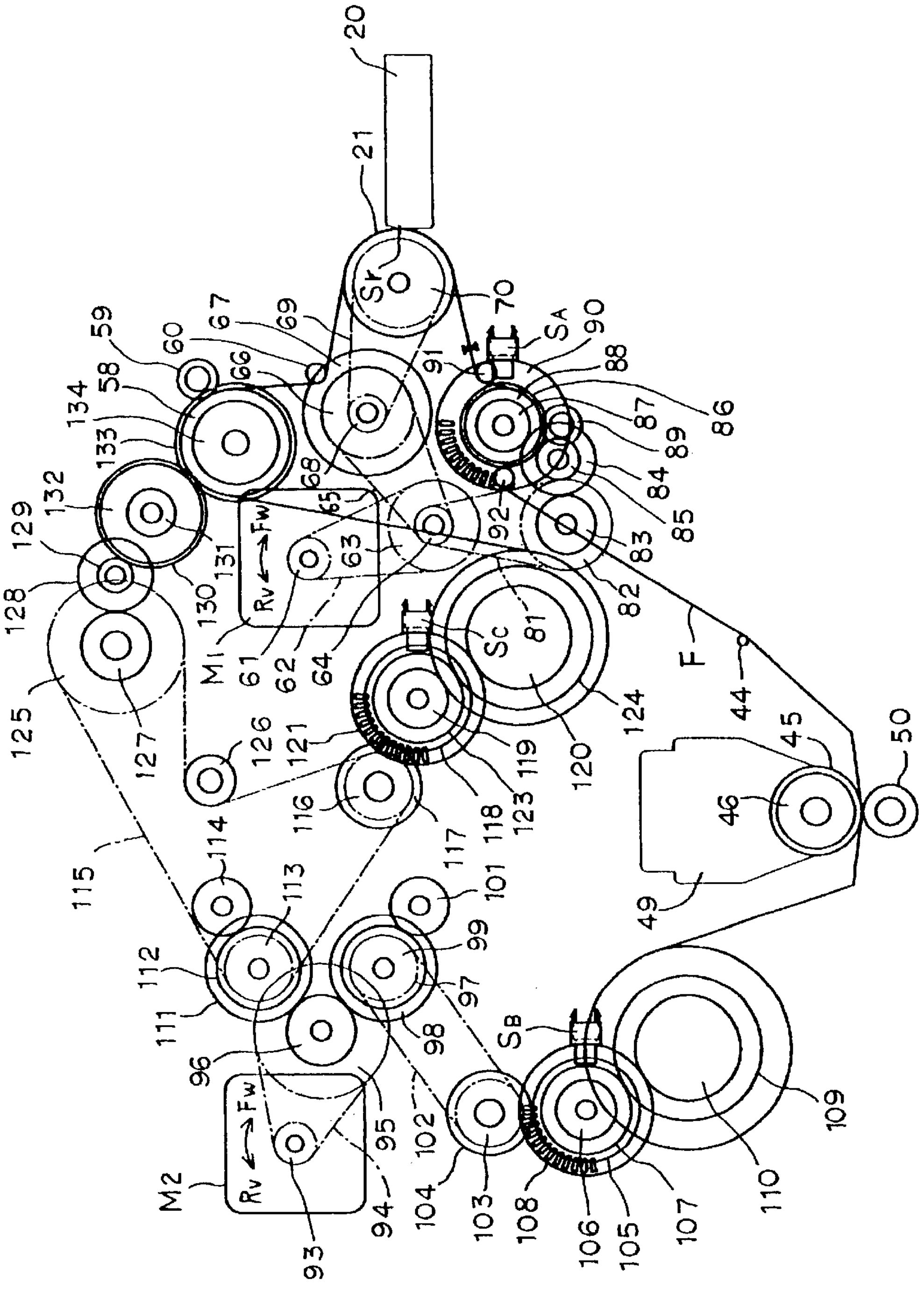
FIG. 2 is a side view showing an intermediate transfer sheet transport mechanism of the image transfer apparatus.

As seen in FIG. 2, in a region defined by the platen roller 21, the card transport path ‘P’ and the frame 2 in FIG. 1, an intermediate sheet transport mechanism as a transfer media transport device is arranged with a reversible drive pulse motor M1 and a reversible drive pulse motor M2 as a driving source. A timing pulley 61 (hereinafter referred to as simply the pulley) is fixed to a motor shaft of the pulse motor M1. An endless timing belt 62 (hereinafter referred to as simply the belt) is extended between the pulley and a pulley 63. A pulley 64 having a diameter smaller than that of the pulley 63 is fixed to the pulley 63.

A belt 65 is trained between the pulley 64 and a pulley 66. A solenoid clutch 67 is attached to a shaft of the pulley 66. The solenoid clutch 67 interlocks a rotational drive of the pulley 66 to a pulley 68 fixed to a shaft of the solenoid clutch 67 when an image is formed on the intermediate transfer sheet F by the thermal head 20. The pulley 70 is fixed to the same shaft as the platen roller 21, and the belt 69 is trained between the pulley 68 and the pulley 70.

Also, another belt 81 is trained to the pulley 64 for transmitting a rotational drive to the pulley 82. A gear 83 is fixed to a shaft of the pulley 82 to engage a gear 84. A gear 85 having a diameter smaller than that of the gear 84 is fixed to a shaft of the gear 84 to engage the gear 86. A torque limiter 87 is fixed to a shaft of the gear 86 so that a rotational drive force is transmitted to a back-tension roller 88 via the torque limiter 87. A pinch roller 89 is pressed against the back-tension roller 88. A clock plate 90 is fixed to a common shaft to the back-tension roller 88. When the intermediate transfer sheet ‘F’ is transported in a reverse direction, the back-tension roller 88 rotates in synchronization with the intermediate transfer sheet ‘F’. A unit transmission sensor $S_A$ is disposed near the clock plate 90 to detect the rotation of the clock plate 90 to control a transport amount of (a fed amount and a returned amount) of the intermediate transfer sheet ‘F’.

A pulley 93 is fixed to a motor shaft of the pulse motor M2. A belt 94 is trained between the pulley 93 and a pulley 95. A gear 96 is fixed to a shaft of the pulley 95.

A one-way gear 97 engages the gear 96, and is fixed to a shaft that transmits a drive from the gear in the counterclockwise rotation and becomes free in the clockwise rotation (freely rotates). A gear 98 and a pulley 99 are fixed to a shaft of the one-way gear 97, and the gear 98 engages a one-way gear 101 that becomes free in the clockwise rotation and is locked in the counterclockwise rotation. A belt 102 is trained between the pulley 99 and a pulley 103. A gear 104 is fixed to a shaft of the pulley 103, and the gear 104 engages a gear 105. A torque limiter 106 is attached to a shaft of the gear 105 for transmitting a rotational drive to a gear 107 via the torque limiter 106. A clock plate 108 is fixed to a shaft same as that of the gear 107. The gear 107 engages a gear 109 that is fixed to a take-up spool shaft 110 to take up the intermediate transfer sheet ‘F’. A unit transmission sensor $S_B$ is disposed near the clock plate 108 to detect the rotation of a take-up spool shaft 110 via the rotation of the clock plate 108 as well as to detect any breakage of the intermediate transfer sheet ‘F’ by monitoring the rotation of the take-up spool shaft 110.

Also, the gear 96 engages a one-way gear 111 that is fixed to a shaft. The shaft transmits the drive from the gear 96 in the counterclockwise rotation, and becomes free in the clockwise rotation. A gear 112 and a pulley 113 are fixed to a shaft of the one-way gear 111, and the gear 112 engages a one-way gear 114 that becomes free in the counterclockwise rotation and is locked in the clockwise rotation. A belt 115 is trained between a pulley 113, a pulley 116 and a pulley 125. To maintain a constant tension on the belt 115, a tension roller 126 is disposed between the pulley 116 and the pulley 125 that are connected by the belt 115. A gear 117 is fixed to a shaft of the gear 116, and engages the gear 118. A torque limiter 119 is fixed to a shaft of the gear 118 for transmitting a rotational drive to a gear 123 via the torque limiter 119. A clock plate 121 is fixed to a shaft same as that of the gear 123. The gear 123 engages the gear 124 that is fixed to the supply spool shaft 120 to supply the intermediate transfer sheet ‘F’. A unit transmission sensor Sc is disposed near the clock plate 121 to detect the rotation of the supply spool shaft 120 via the rotation of the clock plate 121 as well as to detect any breakage of the intermediate transfer sheet ‘F’ by monitoring the rotation of the supply spool shaft 120. The intermediate transfer sheet supply portion 16 is mounted to the supply spool shaft 120, and the sheet take-up portion 17 is mounted to the take-up spool shaft 110.

Also, the drive from the pulley 113 is transmitted to the pulley 125 via the belt 115. A gear 127 is fixed to the gear 125 shaft, and engages a gear 128. The drive is transmitted to a gear 130 via a gear 129 disposed on a shaft same as that of the gear 128. A solenoid clutch 131 is fixed to a shaft of the gear 130. The solenoid clutch 131 interlocks a rotation drive of the gear 130 to the gear 131 via a gear 132 fixed to a shaft of the solenoid clutch 131 only when the intermediate transfer sheet ‘F’ (Rv) is rewound. A torque limiter 134 is fixed to a shaft of the gear 133, and a rotational drive is transmitted via the torque limiter 134 to the transport roller 58 to transport the intermediate transfer sheet ‘F’. Note that when the aforementioned solenoid clutch 131 drive is interlocked, the supply spool shaft 120, the platen roller 21 and the transport roller 58 transport the intermediate transfer sheet ‘F’ in different speeds. The speeds are set be an order of the supply spool shaft 120, the transport roller 58, and the platen roller 21 from fast to slow. Regarding the torque control, the torque is set to be an order of the platen roller 21, the transport roller 58, and the supply spool shaft 120 from large to small.

The rotational direction of the pulse motor M2 switches a direction of the intermediate transfer sheet ‘F’ between a forward (Fw) and a reverse (rewind) (Rv). When the image is transferred on the intermediate transfer sheet ‘F’ while rewinding (Rv), the transport speed of the intermediate transfer sheet ‘F’ by the supply spool shaft 20, the platen roller 21 and the back-tension roller 88 is set to be an order of the supply spool shaft 120, the platen roller 21, the back-tension roller 88 from fast to slow. For this reason, when the intermediate transfer sheet 'F' is separated from the thermal head 20 and is transported, the drive is cut by the solenoid clutch 67 to prevent slackening of the intermediate transfer sheet 'F'.

Figure 3:
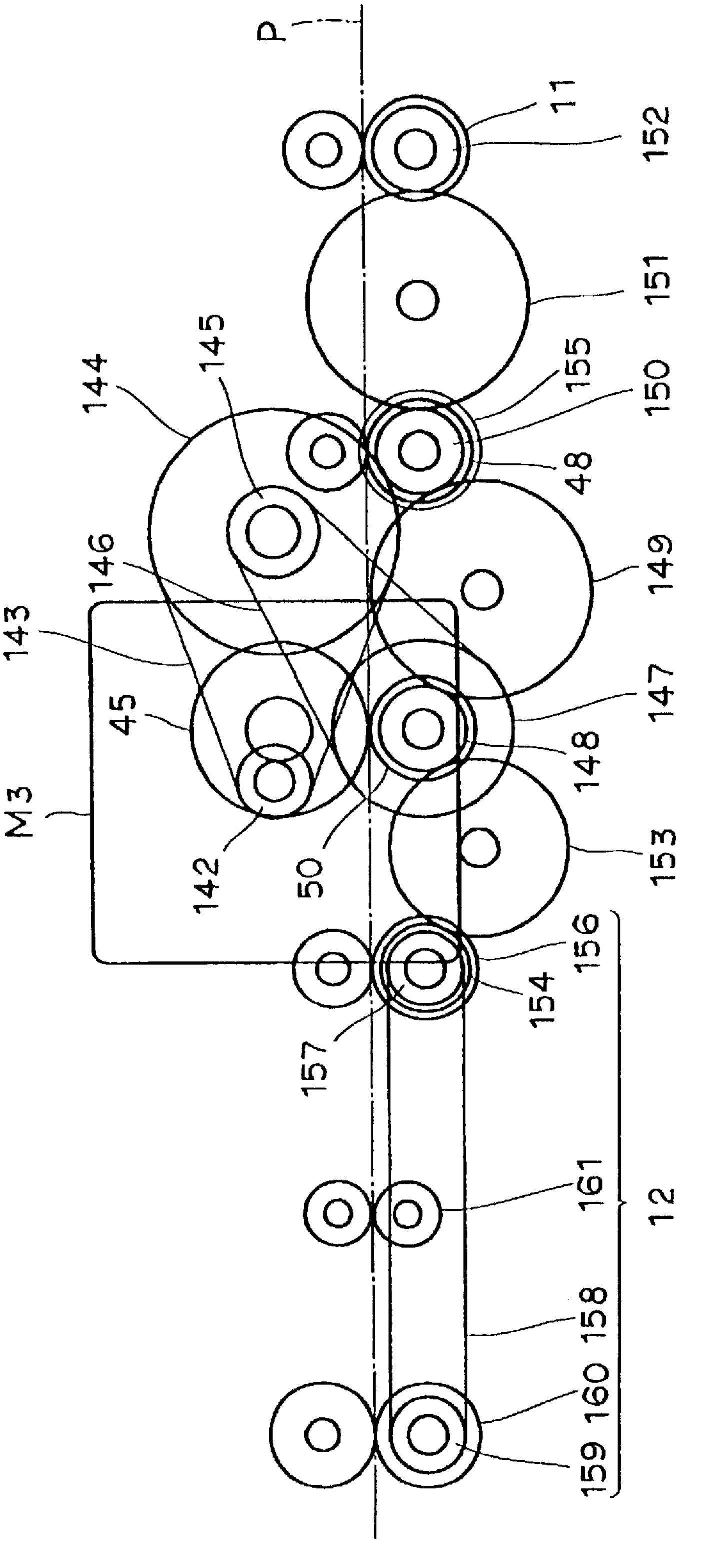
FIG. 3 is a side view showing a card transport mechanism of the image transfer apparatus.

As can be seen in FIG. 3, the card transport drive mechanism is disposed on the card transport path 'P', and uses a reversible pulse motor M3 as a drive source. A pulley 142 is fixed to a shaft of the pulse motor M3. A belt 143 is trained between the pulley 142 and a pulley 144. A pulley 145 is fixed to a shaft of the pulley 144, and has a diameter smaller than the pulley 144. A belt 146 is trained between the pulley 145 and a pulley 147. To a shaft of the pulley 147 are fixed the platen roller 50 and the gear 148 having a diameter smaller than the platen roller 50.

A gear 149 engages the gear 148, and has a diameter larger than that of the gear 148. The gear 149 engages a gear 150. The capstan roller 48, described above, having a diameter larger than that of the gear 150 is fixed to the gear 150 as a drive roller, and constitutes a pair of horizontal transport rollers by pressing the follower rollers on the card transport path 'P'. A torque limiter 155 is fixed to a shaft of the pulley 150, and has a diameter greater than the capstan roller 48. The torque limiter 155 increase the transport speed when a trailing edge of the card 'C' is released from the nip point of the heat roller 45 and platen roller 50 to ensure a good separation (peeling) of the trailing edge of the card C and the intermediate transfer sheet F. (Hereunder, regardless of a horizontal direction of the card 'C', the edge on the side of the arrow 'L' shown in FIG. 1 is called one edge, and the edge on the side of the arrow 'R' in FIG. 1 is called the other edge.) A gear 151 engages the gear 150, and a gear 152 engages the gear 151. A drive roller having a diameter larger than the gear 152 is fixed to a shaft of the gear 152, and is composed of a pair of the horizontal transport rollers 11, described above. The drive roller is arranged to press the follower roller on the card transport path 'P'. Note that the rotational drive force from the pulse motor M3 transmitted to the gear 152 is transmitted to the drive rollers of a pair of the horizontal transport rollers 38 and 39 and to the cleaning roller 34 on the cleaner 4 via a plurality of gears (not shown).

A gear 153 engages the gear 148, and has a diameter larger than that of the gear 148. The gear 153 engages a gear 154. A pulley 157 is fixed to a shaft of the gear 154, and has a diameter smaller than those of a capstan roller 156 and the gear 154. A belt 158 is trained between the pulley 157 and a pulley 159. A discharge roller 160 is fixed to a shaft of the pulley 159 shaft for discharging the transported card to outside of the frame 2. Follower rollers are disposed to press the capstan roller 156 and discharge roller 160 on the card transport path 'P'. Note that a pair of free rollers 161 is disposed between the capstan roller 156 and the discharge roller 160 to correct a deformation of the card 'C' like bending.

As can be seen in FIG. 1, on a line to the arrow direction 'L' extended from the card transport path 'P' in the frame 2, a discharge outlet 27 is disposed to discharge the card 'C' to outside of the frame 2 after printing. A detachable stacker is attached to the frame 2 below the discharge outlet 27 for stocking a stack of the card 'C'. Note that each of unit transmission sensors (not shown) is arranged at between the cleaner 4 and the horizontal transport portion 5; a side of a pair of the horizontal transport rollers 11 near a pair of the horizontal transport rollers 39; between the transfer portion 10 and a pair of the horizontal transport rollers 12; a side of the capstan roller 156 near the discharge roller 160 in the horizontal transport discharge portion 12; and between the horizontal transport discharge portion 12 and the discharge outlet 27. The sensors detect the one edge or the other edge of the card 'C' transported along the card transport path 'P'.

As shown in the FIG. 1, in the frame 2, the image transfer apparatus 1 is provided with a power supply unit 18 for converting a commercial AC power to a DC power to drive and operate each mechanism and control unit; the control unit 19 for controlling an entire operation of the image transfer apparatus 1; and a touch panel 8 disposed on the frame 2 for displaying a status of the image transfer apparatus 1 according to the information from the control unit 19, and allowing an operator to input instructions to the control unit 19.

Figure 5:
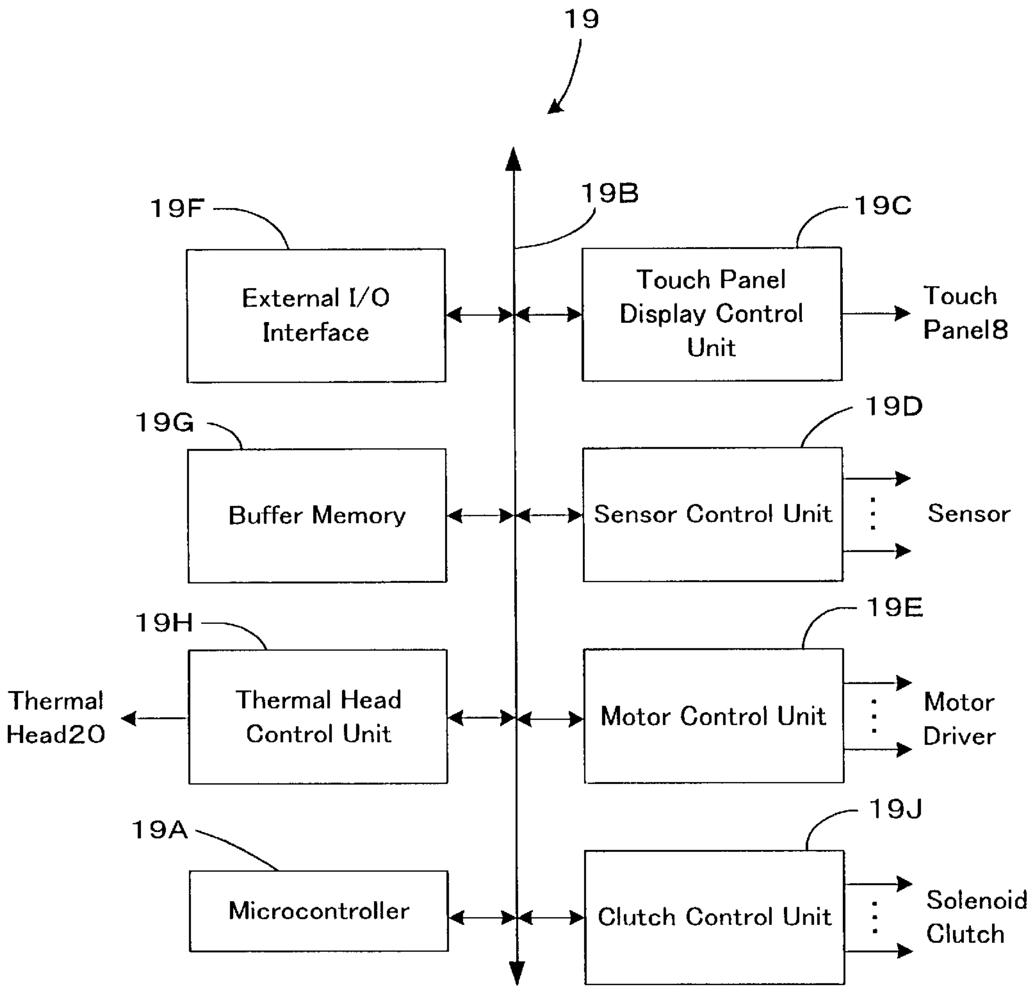
FIG. 5 is a block diagram showing a configuration of a control unit in the image transfer apparatus.

As shown in FIG. 5, the control unit 19 includes a micro-controller 19A for processing on the image transfer apparatus 1. The micro-controller 19A is composed of a CPU for operating under a fast clock speed as a central processing unit, a ROM for storing control instructions for the image transfer apparatus 1, a RAM working as a work area of the CPU, and an internal bus for connecting these components together.

An external bus 19B is connected to the micro-controller 19A. To the external bus 19B are connected a touch panel display operation control portion 19C for controlling instructions and displays of the touch panel 8; a sensor control portion 19D for controlling a signal from each of the sensors; a motor control unit 19E for controlling a motor driver to output a drive pulse to each of the motors; an external I/O interface 19F for communicating between an external computer and the image transfer apparatus 1; a buffer memory 19G for temporarily storing image information for printing to the card 'C'; an thermal head control unit 19H for controlling thermal energy of the thermal head 20; and a clutch control unit 19J for sending ON and OFF control signals to the solenoid clutch. The touch panel display operation control unit 19C, the sensor control unit 19D, the thermal head control unit 19H and the clutch control unit 19J are connected to the touch panel 8, the sensors including Sa to Sc, the drivers including the pulse motor drivers of M1 to M3, the thermal head 20 and the solenoid clutches 67 and 131.

With reference to a flow chart, operations of the image transfer apparatus 1 according to the embodiment of the invention will be explained with focusing on the CPU of the micro-controller 19A in the control unit 19. Assume that the image information received via the external I/O interface 19F and buffer memory 19G from an external computer has been converted to a mirrored image data and stored in the RAM already.

The CPU displays an initial screen on the touch panel via the touch panel display operation control unit 19C. At this time, a start button, a stand-by or print ready state and the number of printed cards on the image transfer apparatus are displayed on the touch panel 8 (or on a monitor of the external computer). When an operator presses the start button, the indirect transfer routine is initiated to transfer the image to the card 'C' using the indirect transfer method.

Figure 6:
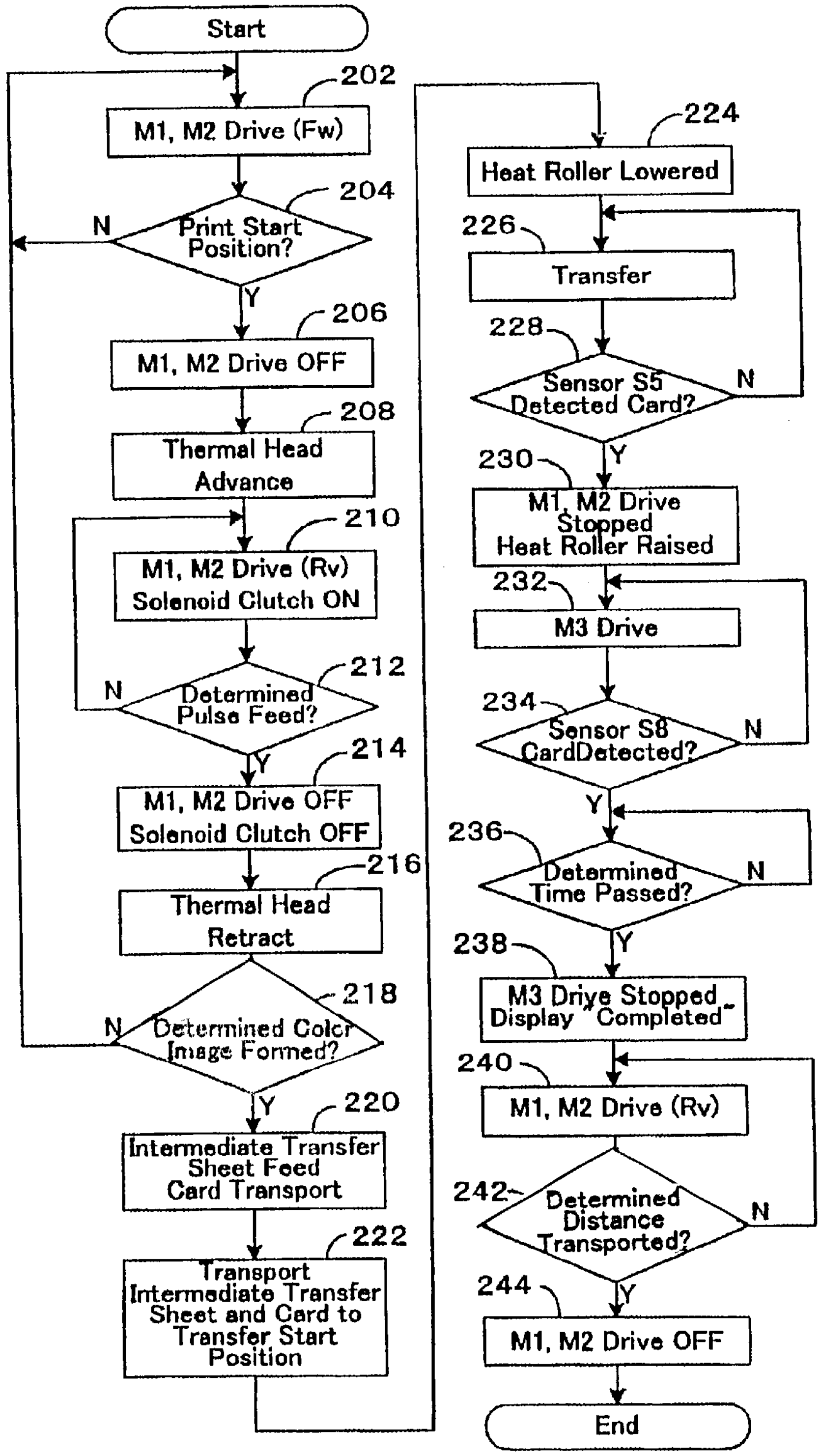
FIG. 6 is a flowchart showing an intermediate transfer routine executed by a CPU of the control unit in the image transfer apparatus.

As shown in FIG. 6, in the indirect transfer routine, the pulse motors M1 and M2 initially rotate in the forward direction (Fw) (in a direction for the sheet winding portion 17 to wind the intermediate transfer sheet 'F') at step 202. At step 204, the light reception sensor S2 is being monitored to recognize the positioning mark formed on the intermediate transfer sheet 'F'. By detecting the amount of rotation of the clock plate 90 connected to the back-tension roller 88 that rotates in both directions along with the intermediate transfer sheet 'F', it is determined whether the intermediate transfer sheet 'F' has been transported to the printing starting position. If it is determined not to be the case, the operation returns to step 202 and continues transporting the intermediate transfer sheet 'F'. If it is determined to be the case, the drive of the pulse motors M1 and M2 are stopped at step 206. During this time, the thermal head 20 is positioned away from the platen roller 21 (see FIG. 7A), and the thermal transfer sheet 'R' is fed by a predetermined distance to a position where, for example, the starting edge of the color 'Y' (yellow) is at the printing position Sr (wound by the thermal transfer sheet take-up portion 15).

Next, at step 208, through the drive of the thermal head sliding drive unit, the thermal head sliding cam 23 is rotated in the arrow direction 'A' to push the thermal head 20 against the platen roller 21 along with the thermal transfer sheet 'R' and the intermediate transfer sheet 'F'. Next, at step 270, while rotating the pulse motor M1 and the pulse motor M2 in the reverse (Rv) direction, the platen roller 21 is rotated in the counterclockwise direction by interlocking the solenoids 67 and 131 thereby rotating the transport roller 58 in the counterclockwise direction. An image starts to form on the intermediate transfer sheet 'F' using the color 'Y' (yellow). In other words, as the thermal head 20 heats the 'Y' (yellow) ink layer on the thermal transfer sheet RR, a mirror image starts to form on the receptive layer Fe of the intermediate transfer sheet 'F'. The platen roller 21 rotates in the counterclockwise direction driven by the pulse motor M1, and the intermediate transfer sheet supply portion 16 winds the intermediate transfer sheet 'F' driven by the pulse motor M2. In synchronization to that, the thermal transfer sheet take-up portion 15 winds the thermal transfer sheet 'R'. Note that the mirror image data (the thermal energy data applied to the thermal head when forming the image) stored in the RAM is sent in advance to the thermal head 20 via the thermal head control unit 19H, and then each of the printing elements on the thermal head 20 are heated according to the mirror data.

At step 212, it is determined whether the pulse motor M1 has driven the determined number of pulses corresponding to a size in the longitudinal direction of the image formed on the intermediate transfer sheet 'F'. Then, it is determined whether the image forming on the intermediate transfer sheet 'F' has been completed. If it is not the case, the operation returns to step 210 and continues forming the image on the intermediate transfer sheet 'F'. If it is the case, both the pulse motors M1 and M2 stop to drive at next step 214, and it releases the interlock of the solenoids 67 and 131 on the platen roller 21 and transport roller 58.

At step 216, the thermal head sliding drive unit rotates the thermal head sliding cam 23 to retract the thermal head 20 from the platen roller 21. At step 218, it determines whether the image forming for the prescribed colors (YMC) has been completed. When it is not the case, it returns to step 202 to form an image over the color already formed on the receptive layer on the intermediate transfer sheet 'F' (for example, 'Y') with the next color (for example, 'M'). If it is the case, in other words, if it is determined that the image forming using the colors YMC has been completed, then it proceeds to step 220.

At step 220, the pulse motor M2 rotates in the forward (feed) direction to feed the intermediate transfer sheet 'F' According to the rotational amount of the clock plate connected to the back-tension roller 88, the intermediate transfer sheet 'F' is transported until the trailing edge of the image region (hereunder the edge of the image region at the image forming portion 9 side is called the trailing edge, regardless of the transport direction of the intermediate transfer sheet 'F') formed on the intermediate transfer sheet 'F' at the image forming portion 9 reaches a predetermined location past the leading edge of the auxiliary guide plate 54 after passing the heat roller 45 away from the platen roller 50, then the pulse motor M2 drive stops. At this time, the sheet take-up portion 17 winds the leading edge of the image region (hereunder the edge of the image region at the sheet take-up portion 17 side is called the leading edge, regardless of the transport direction of the intermediate transfer sheet 'F') on the intermediate transfer sheet 'F'. Upon transporting the intermediate transfer sheet 'F', the light receiving sensor arranged between the guide roller 44 and the guide plate 47 in the transfer portion 10 is monitored to detect the positioning mark on the intermediate transfer sheet 'F', thereby making it possible to reset the amount of transport at this point to improve the accuracy of the transport.

At step 220, the card 'C' is fed out from the card supply portion 3 in parallel with the transport of the intermediate transfer sheet 'F' to the sheet take-up portion 17. The card 'C' is transported along the card transport path 'P' to a position where both edges thereof are nipped by a pair of the horizontal transport rollers having the capstan roller 156 and the discharge roller 160 with the follower roller pressed against the discharge roller 160. The card supply portion 3 and the pulse motor M3 are driven to transport the card 'C' to the card transport path 'P' from the supply portion 3. The cleaner 4 cleans both sides of the card. When one edge of the card 'C' is detected by the unit transmission sensor (not shown) arranged between the cleaner 4 and the horizontal transport portion 5, the kick roller 31 is stopped. The card C is transported over the horizontal transport portion 5 and the transfer portion 10, and further in the arrow direction 'L' along the card transport path P. When the unit transmission sensor S7 (not shown) arranged on the capstan roller 156 side near the discharge roller 160 detects one edge of the card 'C', the card is transported further a determined number of pulses in the arrow direction 'L', and the rotational drive of the pulse motor M3 is stopped. The discharge roller 160 and the follower roller pressing thereto nip one edge of the card 'C'. The other edge is nipped by a pair of the horizontal transport rollers comprising the capstan roller 156.

Figure 9A:
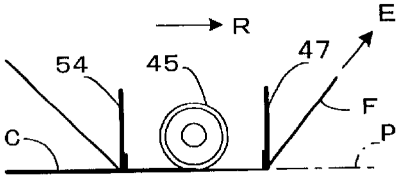
FIG. 9A is a side view showing a portion near a heat roller of a transfer portion in the image transfer apparatus in a state where a card is positioned at a transfer starting position.
Figure 9B:
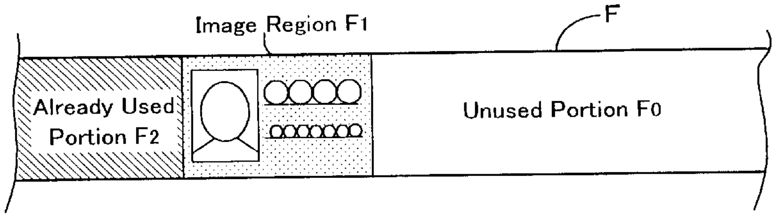
FIG. 9B is a plan view showing an intermediate transfer sheet in the state corresponding to FIG. 9A, FIG. 9C a side view showing the portion near the heat roller of the transfer portion in the image transfer apparatus in a state where the card is positioned at a transfer completed position.

Next, at step 222, the pulse motor M2 is rotated in the reverse direction. The intermediate transfer sheet 'F' is transported in a return direction of the image forming portion 9 side (the arrow direction 'E' in FIG. 9A) until the trailing edge of the image region is at a position corresponding to the transfer starting position (as shown in FIG. 9A and FIG. 9B, a position perpendicular in an imaginary vertical line from the center of the heat roller 45 to the card transport path 'P' when the heat roller 45 is lowered), and the drive of the pulse motor M2 is stopped. Note that at step 222, as shown in FIG. 8A, the heat roller 45 is positioned at a retracted position from the platen roller 50. Also, when transporting the intermediate transfer sheet 'F' to the image forming portion 9, the positioning mark on the intermediate transfer sheet 'F' is detected by monitoring an output from the light receiving sensor. The amount of transport is reset, thereby improving the accuracy of the transport.

At step 222, along with the transport of the intermediate transfer sheet 'F' to the image forming portion 9, the card 'C', whose both ends are nipped by the follower roller pressed against the discharge roller and a pair of the horizontal transport rollers having the capstan roller 156, is transported to the image forming portion position. In other words, the pulse motor M3 is driven in reverse, and the card 'C' both edges thereof nipped is transported over the card transport path 'P' in the arrow direction 'R'. After the other edge of the card C is detected by the unit transmission sensor (not shown) arranged between the transfer portion 10 and the horizontal transport discharge portion 12, the card 'C' is transported further in the arrow direction 'R' by a determined number of pulses, and the pulse motor M3 reverse drive is stopped to transport the other edge of the card 'C' to the position corresponding to the image forming position.

At step 224, the heat roller elevator drive unit drives the heat roller elevator cam 51 to rotate in the arrow direction 'B'. The heat roller 45 moves down from the retracted position to the image transfer position contacting the platen roller 50 through the intermediate transfer sheet 'F' and the card 'C' on the card transport path 'P', then the heat roller elevator drive unit drive is stopped. At this point, edges of the guide plate 47 and the auxiliary guide plate 54 attached to a frame of the transfer portion 10 are positioned on or below the card transport path 'P'. The platen roller 50 supports backside of the card 'C' at one edge thereof, and the trailing edge of the image forming region F1 on the intermediate transfer sheet 'F' is touched by the heat roller 45 from above to contact the other edge of the card C (see FIG. 9A).

Figure 9C:
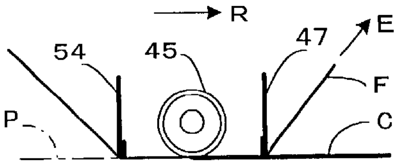
FIG. 9D is a plan view showing the intermediate transfer sheet in the state corresponding to FIG. 9C, FIG. 9E a side view showing the portion near the heat roller of the transfer portion in the image transfer apparatus in a state where an intermediate transfer sheet and the card are separated.
FIG. 9F is a plan view showing the intermediate transfer sheet in the state corresponding to FIG. 9E.
Figure 9D:
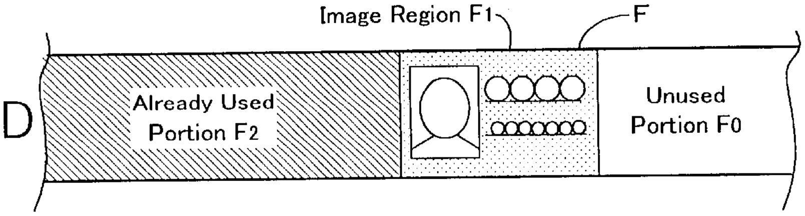
Figure 9E:
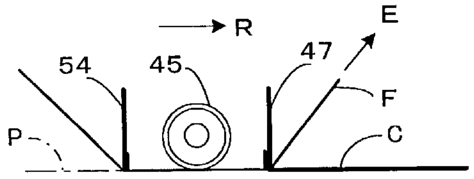
Figure 9F:
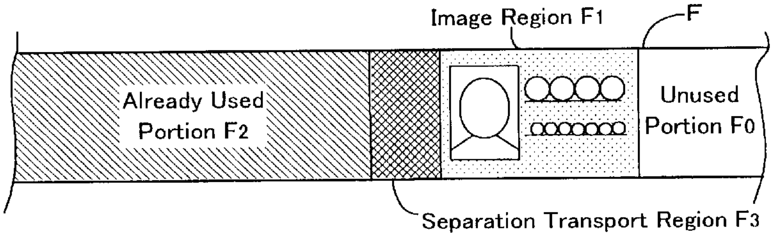
Figure 10A:
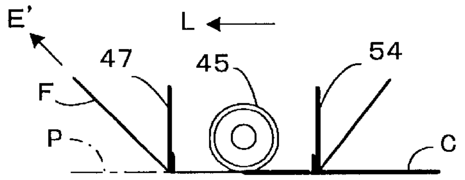
FIG.10A PRIOR ART
FIG. 10A is a side view showing a portion near a heat roller of a transfer portion in a conventional image transfer apparatus in a state where a card is positioned at a transfer starting position.
Figure 10B:
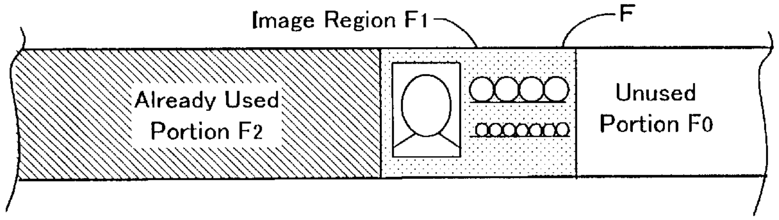
FIG.10B PRIOR ART
FIG. 10B is a plan view showing an intermediate transfer sheet in the state corresponding to FIG. 10A, FIG. 10C a side view showing the portion near the heat roller of the transfer portion in the image transfer apparatus in a state where the card is positioned at a transfer completed position.
Figure 10C:
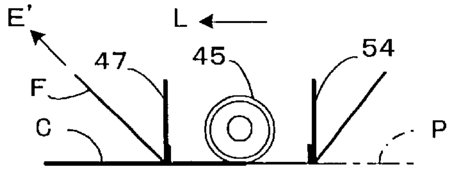
FIG.10C PRIOR ART
FIG. 10D is a plan view showing the intermediate transfer sheet in the state corresponding to FIG. 10C, FIG. 10E a side view showing the portion near the heat roller of the transfer portion in the image transfer apparatus in a state where an intermediate transfer sheet and the card are separated.
FIG. 10F is a plan view showing the intermediate transfer sheet in the state corresponding to FIG. 10E.
Figure 10D:
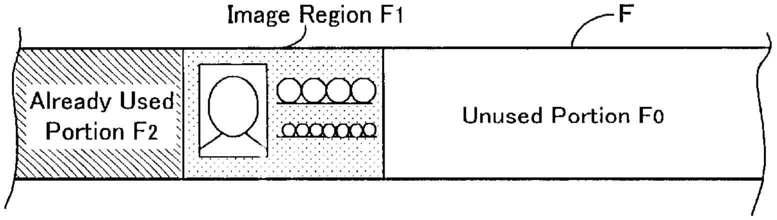
FIG.10D PRIOR ART
Figure 10E:
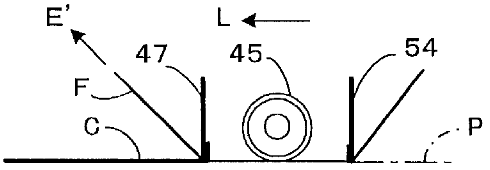
FIG.10E PRIOR ART
Figure 10F:
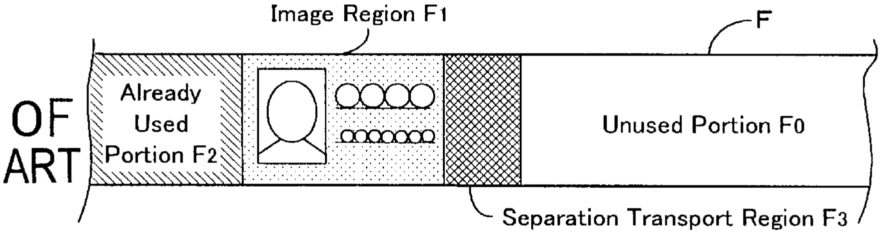
FIG.10F PRIOR ART

At step 226, the pulse motor M2 and the pulse motor M3 rotate in the reverse direction to perform the indirect transfer where the mirrored image on the image region F1 on the intermediate transfer sheet 'F' is thermally transferred on an image transfer surface of the card 'C' using the heat roller 45. To describe in more detail, the platen roller 50 supports backside of the card 'C' while rotating in the counterclockwise direction, and the image transfer surface of the card 'C' is pushed against the heat roller 45 via the intermediate transfer sheet 'F', then the card is transported in the arrow direction 'R'. The peeling layer Fc on the image forming region F1, which is guided substantially horizontally along the card transport path 'P' by the guide plate 47 and the auxiliary guide plate 54, peels from the base film Fa by the heat from the heat generating lamp 46. The receptive layer Fe and the overcoat layer Fd on the image region F1 are transferred to the card C together (see FIG. 8B). When transferring, the card 'C' and the intermediate transfer sheet 'F' move at the same speed. The pulse motor M2 rotates in reverse to wind the intermediate transfer sheet 'F' on the intermediate transfer sheet supply portion 16. During this time, at step 228, by monitoring the unit transmission sensor (not shown) arranged at a pair of the horizontal transport rollers 11 near a pair of the horizontal transport rollers 39, it is determined whether the other edge of the card C has been detected. Then, it is determined whether the intermediate transfer sheet 'F' is completely separated from the card 'C' by the guide plate 47. In other words, the unit transmission sensor detects the other edge of the card 'C' to determines whether the intermediate transfer sheet 'F' and the card 'C' have passed the transfer complete position to complete the transfer of the image region F1 to the card, shown in the FIG. 9C and FIG. 9D, from the transfer starting position shown in the FIG. 9A and the FIG. 9B. Further, the intermediate transfer sheet 'F' and the card 'C' are transported in the arrow directions 'E' and 'R' to separate (hereinafter referred to separation transport). Then, as shown in FIG. 9E and FIG. 9F, it is determined whether the leading portion of the image region of the intermediate transfer sheet 'F' and one side of the card 'C' are positioned at the separation complete position. If it not the case, it returns to step 226 and continues the transfer. If it is the case, the intermediate transfer sheet 'F' and the card 'C' are transported in the arrow directions 'E' and 'R' by a predetermined number of pulses to separate by the torque limiter described above (omitted from the view in FIG. 6).

At step 230, the pulse motors M2 and M3 are stopped, and the intermediate transfer sheet 'F' and the card 'C' transferred or separated are stopped. The heat roller elevator drive unit is driven to rotate the heat roller elevator cam 51 again to position the heat roller 45 in a retracted position (raised) with respect to the platen roller 50. At step 232, the pulse motor M3 is driven to transport the card 'C' further in the arrow direction 'L' along the card transport path 'P'. At step 232, it is determined whether the unit transmission sensor S8 (not shown) arranged between the horizontal transport discharge portion 12 and the discharge outlet 27 has detected the other edge of the card 'C'. If is not the case, it returns to step 232 to transport the card 'C' further. If it is the case, step 236 is held for a predetermined period of time to continue transporting the card 'C'. The card C is discharged to the stacker 13 via the discharge outlet 27. Next, at step 238, the drive of the pulse motor M3 is stopped, and the number of processed cards or the processing completion is displayed on the touch panel 8.

From step 240 to step 244, an unused portion Fo (see FIG. 9F) adjacent to the image region F1 on the intermediate transfer sheet 'F' is transported near the image forming portion 9 to end the indirect transfer routine and prepare for a new card. In other words, at step 240, the pulse motors M1 and M2 are driven in reverse. At step 240, the unit transmission sensor is monitored to determine whether it has been transported by a predetermined distance. If it is not the case, it returns to step 240 and continues the transport up to near the image forming portion 9 of the unused portion Fo on the intermediate transfer sheet 'F'. If it is the case, the pulse motors M1 and M2 stop at the next step 244.

Next, an effect of the image forming apparatus 1 according to the embodiment will be explained.

As described, in the image forming apparatus 1 according to the embodiment of the invention, when transferring and separating, the intermediate transfer sheet 'F' is transported in the arrow direction 'E', which is the reverse direction to the image forming portion 9, and the card C is transported in the arrow direction 'R' (see FIG. 9A to FIG. 9F). Thus, after completing the transfer (see FIG. 9C and FIG. 9D), to separate the intermediate transfer sheet 'F' and the card 'C', the separation transport is performed between the heat roller 45 and the guide plate 47 (see FIG. 9E and FIG. 9F). The separation transport region F3 on the intermediate transfer sheet 'F' is the portion F2 that is an used portion of the intermediate transfer sheet 'F' because the separation transport occurs in the arrow direction 'E'. As can be seen in FIG. 10A to FIG. 10F, according to the prior art, if the intermediate transfer sheet 'F' and the card 'C' are transported in the arrow directions 'E'' and 'L' opposite to those in the present embodiment, the separation transport region F3 on the intermediate transfer sheet F is the unused portion Fo on the intermediate transfer sheet 'F' because the separation transport of the intermediate transfer sheet 'F' would be in the arrow direction 'E' '. (See FIG. 10F) Therefore, in the transport direction in the conventional image forming apparatus, heat from the heat roller 45 is transmitted to the separation transport region F3, i.e. the unused portion Fo, and thermal shrinking causes wrinkles or degradation such as changes in quality. As a result, high image quality or high quality image printing to the card C become difficult when transferring to subsequent cards. The unused portion Fo can be discarded to maintain the quality when transferring images by not using the separation transport region F3, i.e. the degraded unused portion Fo. The intermediate transfer sheet 'F', however, can not be used efficiently, resulting in a higher running cost for manufacturing the card 'C'. As described above, in the image forming apparatus 1 according to the present embodiment, it is possible to continuously transfer an high quality image while reducing the running cost of the intermediate transfer sheet 'F' which is a consumable portion. This is because the heat roller 45 does not degrade the unused portion Fo by contact as the intermediate transfer sheet 'F' is transported in the arrow direction 'E' and the separation transport region F3 is the used portion F2. Note that FIG. 10A and FIG. 10B correspond to FIG. 9A and FIG. 9B, FIG. 10C and FIG. 10D to FIG. 9C and FIG. 9D, and FIG. 10E and FIG. 10F to FIG. 9E and FIG. 9F.

In the image forming apparatus 1 according to the present embodiment, the guide plate 47 attached to the frame of the transfer portion 10 is movable in the direction to separate from the card transport path 'P' along with the heat roller 45 by the heat roller elevator drive unit. The leading edge of the guide plate 47 is positioned above or below the card transport path 'P' when the heat roller 45 is lowered. Thus, when transferring, in cooperative movement with the auxiliary guide plate 54, it makes the intermediate transfer sheet 'F' contact the surface of the card 'C' on the card transport path 'P', thereby ensuring the transfer of the image region Fo to the card C by the heat roller 45. When performing the separation transport, in cooperation with the movement of the auxiliary guide plate 54, it stabilizes the intermediate transfer sheet 'F' along the card transport path 'P' to enable transport. When separating, it applies an angle to enable separation of the card 'C' being transported in the horizontal direction and the intermediate transfer sheet 'F' being transported in the arrow direction 'E', so it can handle the separation of both. When separating, separation of the intermediate transfer sheet F and the card C are further promoted by the cooperative movement of the torque limiter 155. Also, when the heat roller 45 is at the retracted position, the card 'C' is transported without any contact over the card transport path 'P', thereby reducing damage by separating the intermediate transfer sheet 'F' from the card transport path 'P'.

Figure 11:
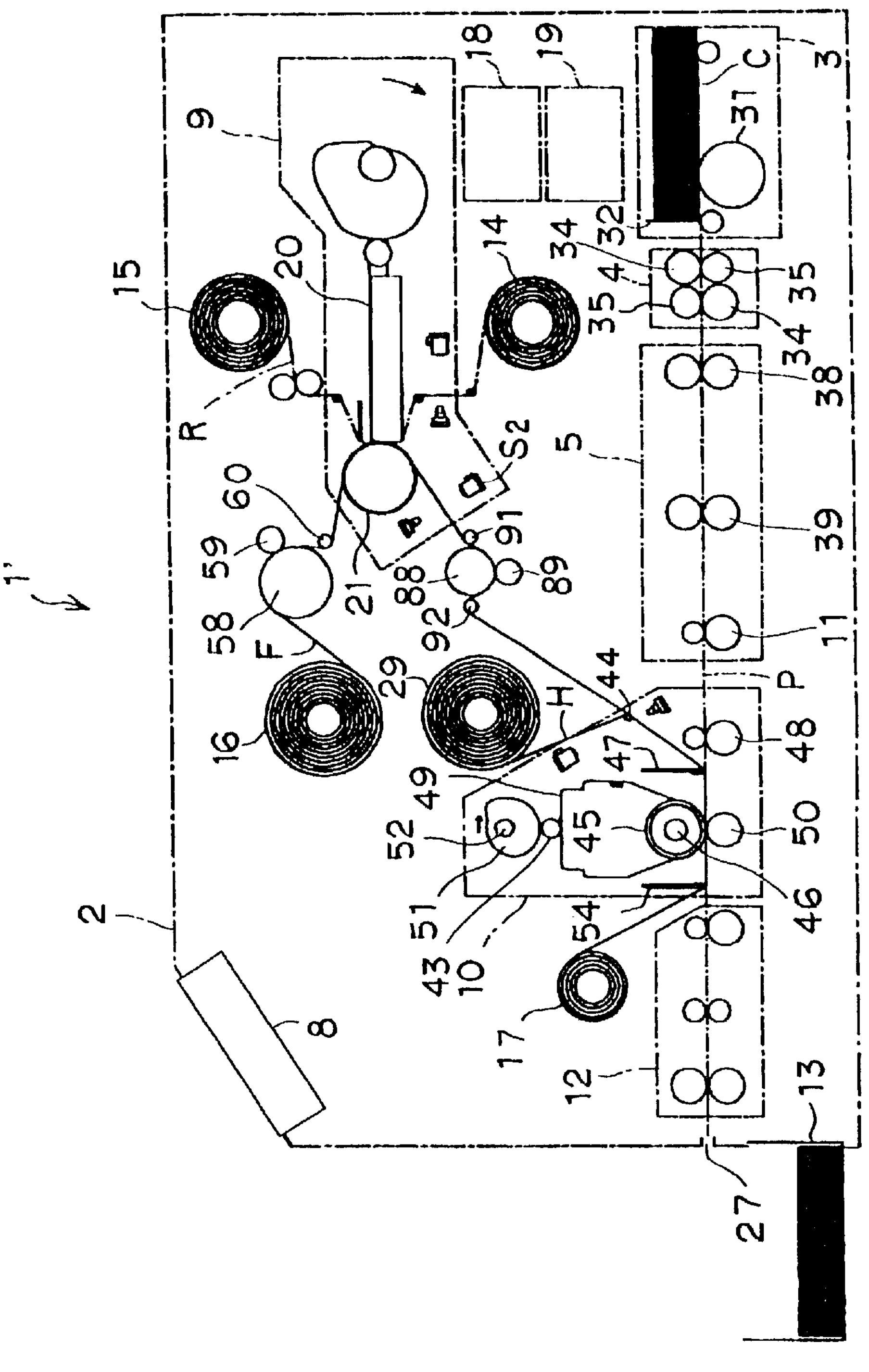
FIG. 11 is a side view showing a configuration of an image transfer apparatus according to another embodiment of the present invention.

Note that, according to the present embodiment, it has been shown that any images can be formed on the intermediate transfer sheet 'F' supplied from the intermediate transfer sheet supply portion 16 at the image forming portion 9, and can be transferred to the card C at the transfer portion 10. This invention can be applied to holograms formed with specific images or patterns. For example, as shown in FIG. 11, the image forming apparatus 1' is equipped with the intermediate transfer sheet supply portion 16 as well as the hologram supply portion 29. The hologram sheet 'H' is guided by the guide plate 47 and the auxiliary guide plate 54 disposed on both sides of the transfer portion 10 via the guide rollers and wound to the sheet take-up portion 17. When using the intermediate transfer sheet 'F', the hologram sheet 'H' is completely wound back to the hologram sheet supply portion 29. When using the hologram sheet 'H', the intermediate transfer sheet 'F' is completely wound back to the intermediate transfer sheet supply portion 16. The sheet takeup portion 17 can use either sheet by winding either the intermediate transfer sheet 'F' or the hologram sheet 'H'. The CPU determines whether the intermediate transfer sheet 'F' is to be used by monitoring the light reception sensor S2 arranged between the platen roller 21 and the guide roller 91. The hologram sheet 'H', in the same way as the intermediate transfer sheet 'F' described above, is transferred in the direction to rewind back to the hologram sheet supply portion 29. The image forming apparatus 1' can achieve high efficiency for the hologram sheet 'H' as well. Note that in FIG. 11, the same numbers are used for the same components in the image forming apparatus 1 of FIG. 1. Therefore, according to the above embodiment, the term "transfer media supply portion" used in this invention describes the mechanism at an upstream to supply the intermediate transfer sheet 'F' with an image or the hologram sheet to the transfer portion 10.

Also, according to the present embodiment, the auxiliary guide plate 54 has a length same as that of the guide plate 47, as shown in FIG. 8A. And the intermediate transfer sheet 'F' is positioned horizontally in parallel to the card transport path 'P' when the heat roller 45 is in retracted position. The function of the auxiliary guide plate 54 is to prevent contact between the intermediate transfer sheet 'F' and the card 'C' in the retracted position, thus the auxiliary guide plate 54 does not necessarily have to have a length same as that of the guide plate 47 and could be shorter.

According to the above description, in the first embodiment of the present invention, the image transfer is performed in the direction opposite to that of the prior art, and in the direction to the transfer media supply portion of the transfer media. Thus, the used portion of the transfer medium is transported for separation. Because only the used portion comes into contact with the transfer device, there is no contact of the unused portion so there is no degradation of the unused portion, allowing the continuous transferring of high quality images and high quality transfer. Furthermore, because there is no processing required for degraded unused portions that cannot be used, the running cost is reduced. According to the second embodiment, the transfer medium is moved in the direction to separate with regard to the transfer medium transport path by the transfer medium guide, so the accuracy of the transfer to the recording medium is improved by positioning the recording medium on the recording medium transport path when transferring images with the transfer means. This invention is capable of ensuring a stable transfer up to the separation of the transfer medium after transferring the image, while preventing damage caused by the contact of the recording medium transported over the recording medium transport path and the transfer medium. The third embodiment, in the same way as the first embodiment, transports the used portion of the transfer medium for separation, so it achieves high quality image transfer and does not need processing of degraded unused portions that cannot be used, so it also reduces the running costs.

While the invention has been explained with reference to the specific embodiments of the invention, the explanation is illustrative, and the invention is limited only by the appended claims.

What is claimed is:

1. An image transfer apparatus for transferring an image from a transfer medium to a recoding medium, comprising, a transfer medium supply portion for supplying the transfer medium, a transfer medium take-up portion for taking up the transfer medium, transfer means disposed between the transfer medium supply portion and the transfer medium take-up portion for transferring the image on the transfer medium to the recording medium, and transfer medium transport means for transporting the transfer medium back and forth, said transfer medium transport means transporting the transfer medium forward without image transfer to the recording medium and then moving the transfer medium backward to the transfer medium supply portion when the transfer means transfers the image to the recording medium.

2. An image transfer apparatus according to claim 1, wherein said transfer medium transport means operates to completely move the image on the transfer medium to be transferred passing the transfer means to the transfer medium take-up portion, and to move the transfer medium toward the transfer medium supply portion such that the image on the transfer medium is transferred to the recording medium by the transfer means.

3. An image transfer apparatus according to claim 2, further comprising moving means for moving said transfer means, said moving means holding the transfer means for a predetermined period of time at a position where the transfer means transfers the image to the recording medium after the transfer means completes to transfer the image to the recording medium, and moving the transfer means away from the position.

4. An image transfer apparatus according to claim 3, wherein said transfer means is a heat roller comprising exothermic means.

5. An image transfer apparatus according to claim 1, further comprising image forming means disposed in the transfer media supply portion for forming the image on the transfer medium.

6. An image transfer apparatus according to claim 1, further comprising a recording medium transport path disposed between the transfer medium supply portion and the transfer medium take-up portion for transporting the recording medium, and transfer medium guide means disposed between the transfer medium supply portion and the transfer means for guiding the transfer medium to the transfer means, said transfer medium guide means being able to move close to and away from the recording medium transport path.

7. An image transfer apparatus according to claim 6, wherein said transfer medium guide means further comprises a guide portion for guiding the recording medium and the transfer medium, and separating the recording medium from the transfer medium.

8. An image transfer apparatus according to claim 7, wherein said guide portion has an edge positioned at the recording medium transport path when the transfer means transfers the image to the recording medium.

9. An image transfer method comprising steps of:

transporting a recording medium to an image transfer position, transporting a transfer medium from a supply side passing the image transfer position, transferring an image on the transfer medium to the recording medium at the image transfer position while transporting the transfer medium backward to the supply side.

10. An image transfer apparatus according to claim 9, further comprising a step of forming the image on the transfer medium at an image forming position before said step of transporting the transfer medium.

* * * * *